(12) United States Patent
Machledt et al.

(10) Patent No.: US 6,772,566 B1
(45) Date of Patent: Aug. 10, 2004

(54) BELOW GRADE UTILITIES VAULT

(76) Inventors: Charles G. Machledt, 6306 Winding Brook Dr., New Port Richey, FL (US) 34655; Fredric P. Machledt, 5202 N. New Jersey St., Indianapolis, IN (US) 46220

(*) Notice: Subject to any disclaimer, the term of this patent is extended or adjusted under 35 U.S.C. 154(b) by 0 days.

(21) Appl. No.: 10/609,381

(22) Filed: Jul. 1, 2003

(51) Int. Cl.[7] .............................. E04H 5/04; E04H 5/06
(52) U.S. Cl. ................. 52/169.6; 52/79.1; 52/169.1; 52/36.1; 52/36.2; 220/4.02; 220/484; 220/567.1; 361/601
(58) Field of Search .................... 52/20, 21, 79.1, 52/79.9, 79.14, 169.1, 169.6, 169.7, 36.1, 36.2, 36.4–36.6, 128; 174/50, 61, 65 R, 50.5, 50.51; 220/3.2, 4.02, 484, 485, 500, 567.1; 361/600, 601, 602–603, 605, 625, 641, 679; 454/184

(56) References Cited

U.S. PATENT DOCUMENTS

| | | | | |
|---|---|---|---|---|
| 1,719,224 A | * | 7/1929 | Haase ......................... 220/484 |
| 2,871,457 A | * | 1/1959 | Jencks ......................... 439/370 |
| 3,263,853 A | * | 8/1966 | Smith .......................... 220/484 |
| 3,360,752 A | | 12/1967 | Uptegraff, Jr. |
| 3,498,011 A | * | 3/1970 | Lindgren ......................... 52/31 |
| 3,809,969 A | * | 5/1974 | Williams et al. ............. 361/601 |
| 4,005,253 A | * | 1/1977 | Walter .......................... 174/37 |
| 4,771,910 A | * | 9/1988 | Roy ........................... 220/4.02 |
| 4,836,408 A | * | 6/1989 | Roy ........................... 220/4.02 |
| 4,840,285 A | * | 6/1989 | Carr ........................... 220/4.02 |
| 4,872,575 A | * | 10/1989 | Kobilan ....................... 220/3.3 |
| 4,961,293 A | * | 10/1990 | House et al. ................... 52/21 |
| 5,249,697 A | * | 10/1993 | McKinnon .................. 220/484 |
| 5,272,279 A | * | 12/1993 | Filshie ......................... 174/50 |
| 5,534,664 A | * | 7/1996 | Fearing et al. ................ 174/50 |
| 5,568,362 A | * | 10/1996 | Hansson ..................... 361/736 |
| 5,778,608 A | * | 7/1998 | Elliott, Jr. .................... 52/79.9 |
| 5,791,098 A | * | 8/1998 | Thomas ..................... 52/169.6 |
| 5,828,544 A | * | 10/1998 | Matsuda ..................... 361/641 |
| 5,864,091 A | * | 1/1999 | Sumida ....................... 174/50 |
| 5,939,669 A | * | 8/1999 | Finzel et al. .................. 174/38 |
| 5,950,368 A | * | 9/1999 | Bradford ....................... 52/20 |
| 6,006,944 A | | 12/1999 | Machledt |
| 6,016,828 A | * | 1/2000 | Machledt .................... 137/202 |
| 6,164,369 A | | 12/2000 | Stoller |
| 6,173,733 B1 | * | 1/2001 | Pruitt et al. ................. 137/382 |
| 6,229,707 B1 | * | 5/2001 | Keenan et al. ............. 361/724 |
| 6,304,444 B1 | * | 10/2001 | Combs et al. .............. 361/695 |
| 6,359,218 B1 | * | 3/2002 | Koch et al. ................... 174/50 |
| 6,365,826 B1 | * | 4/2002 | Stendardo et al. ...... 174/17 VA |
| 6,422,413 B1 | * | 7/2002 | Hall et al. ............... 220/567.2 |
| 6,586,674 B2 | * | 7/2003 | Krause et al. ............. 174/50.5 |
| 6,629,619 B2 | * | 10/2003 | Sato et al. ................. 220/4.02 |
| 6,642,446 B2 | * | 11/2003 | Dodds et al. ................. 174/50 |

* cited by examiner

*Primary Examiner*—Jeanette Chapman
(74) *Attorney, Agent, or Firm*—Eugene Byrd

(57) ABSTRACT

A below grade utilities connections vault is disclosed. The vault of the present invention comprises a concrete box with lockable, hinged lid. A floor platform lies at a distance above the bottom of the box such that utilities cables enter the box below the level of the floor. A hinged utilities wiring frame is mounted to the wall opposite the lid hinge such that the frame hinges down into the box when the vault is closed and into a vertical position for making connections. A safety barrier is formed by the lid, the wiring frame, and barrier arms which hinge between them surrounds the vault, when open. A venting system provides egress for gasses and equalization of pressure between the interior and exterior of the vault.

11 Claims, 5 Drawing Sheets

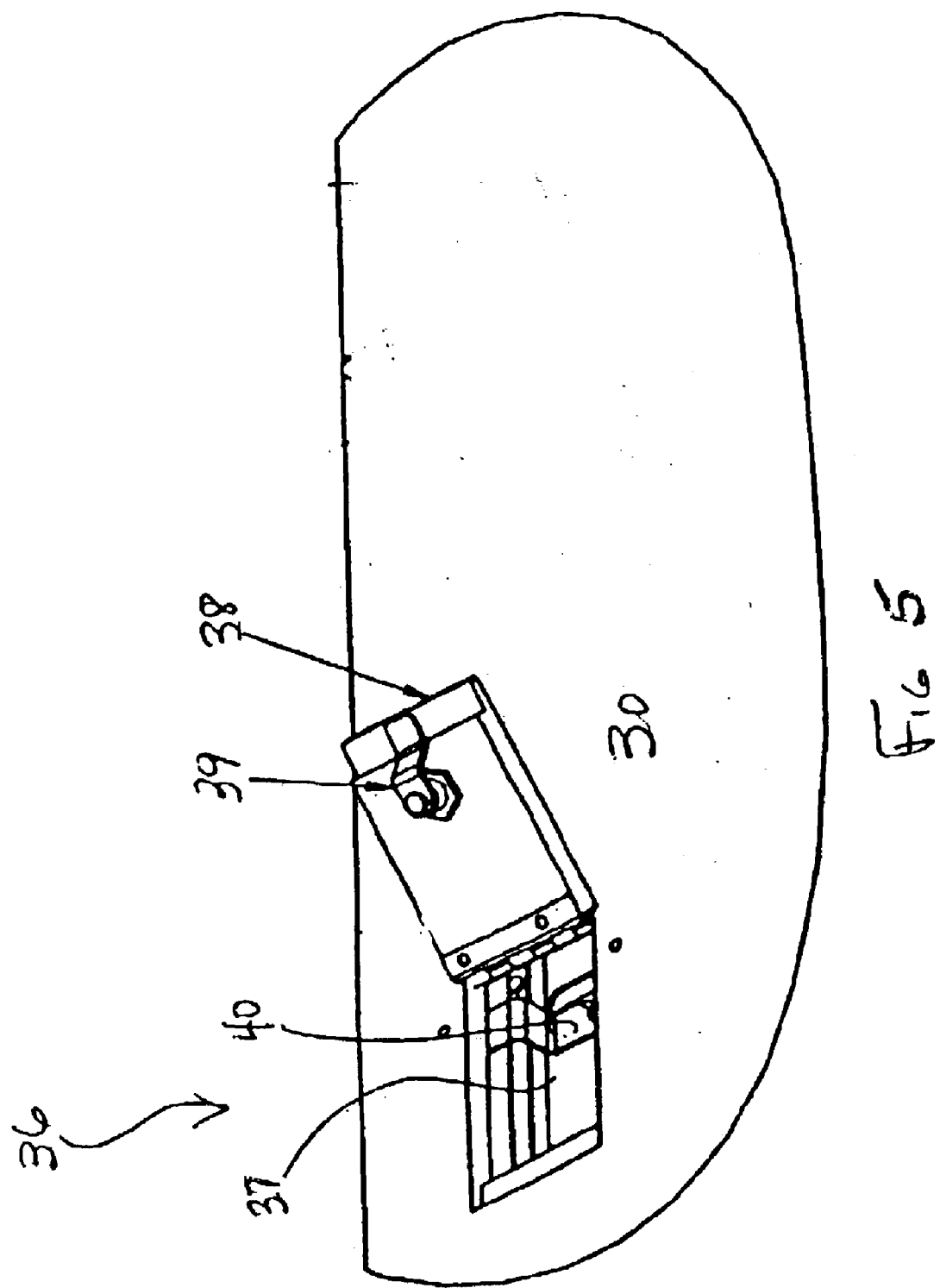

BELOW GRADE UTILITIES VAULT

BACKGROUND OF THE INVENTION

1. Field of the Invention

The present invention relates to below grade utilities vaults. More particularly, the invention comprises a vault, having a openable top which may be installed flush with a ground surface, providing a dry, secure chamber for housing utilities connections.

2. Description of the Prior Art

Subterranean chambers are frequently used for utilities connections, especially in urban areas, where above ground space is at a premium or there is a strong desire to maintain an aesthetically pleasing landscape. While the vaults are below ground level, it is desirable to maintain a dry, environment which is conducive to maintaining the utilities connections in a good condition and acceptable working conditions for those who must install and service them.

U.S. Pat. No. 6,304,444 B1, issued to Charles D. Combs, et al., on Oct. 16, 2001, presents an UNDERGROUND CENTRALIZED POWER SUPPLY/BATTERY VAULT. An above ground unit having an intake fan and a discharge fan forces outside air to flow through a multi-chambered, partially submerged vault. A ducted, positive airflow is maintained such that air flows from the first chamber to the second chamber, preventing contaminated air from flowing from the second chamber to the first. With the exception of air ducts, the vault of Combs provides no ingress/egress for utilities, but rather provides a chamber for storage.

In U.S. Pat. No. 6,006,944, issued to Charles G. Machledt on Dec. 28, 1999, a BATTERY STORAGE VAULT is disclosed. An underground vault having a ground level, openable top is connected by a conduit to a separate equipment vault, thereby separating batteries and the associated gas fumes from the equipment. A separate ventilation system prevents fumes from migrating to the equipment vault.

U.S. Pat. No. 3,360,652, issued to Roy E. Uptegraff, Jr., on Dec. 26, 1967, discloses a TRANSFORMER HOUSING CONSTRUCTION. A vertical housing having a back, two side walls, and a front having a removable door cover is joined to a top and a bottom such that a gap is formed between the vertical housing and the top and bottom. Airflow through the upper and lower gaps provides cooling to a transformer housed within the construction.

None of the above inventions and patents, taken either singly or in combination, is seen to describe the instant invention as claimed.

SUMMARY OF THE INVENTION

The present invention fulfills the need for a dry, secure, below grade housing for utilities connections, especially those utilities using wire type transmission lines, in an outdoor environment. In such applications, it is desirable to have connection terminals which may be conveniently accessed without the need for working in cramped quarters, without requiring a large work area. The present invention provides a wiring frame which may be stored horizontally within a below grade vault, but hinged into a vertical, above grade, position, for making connections.

Accordingly, it is a principal object of the invention to provide a below grade utilities connections vault which may be easily installed in a below grade position.

It is another object of the invention to provide a below grade utilities connections vault which may be easily accessed for making utilities connections in a convenient working environment.

It is a further object of the invention to provide a below grade utilities connections vault which incorporates features to ensure public safety when in an open position.

Still another object of the invention is to provide a below grade utilities connections vault which is secure against unauthorized access and tampering.

An additional object of the invention is to provide a below grade utilities connections vault which has sufficient weight to resist the effects of ground water lift.

Yet another object of the invention is to provide a below grade utilities connections vault with an external stepped flair around the bottom thereof to help lock the vault in place by the weight of gravel/soil compacted thereabove.

It is again an object of the invention to provide a below grade utilities connections vault which is ventilated to ensure exit of gasses and equalization of pressure between the interior and exterior thereof.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 5 is a perspective view of a portion of the upper surface of the lid of the present invention showing the locking system.

DETAILED DESCRIPTION OF THE PREFERRED EMBODIMENTS

Figure 1:
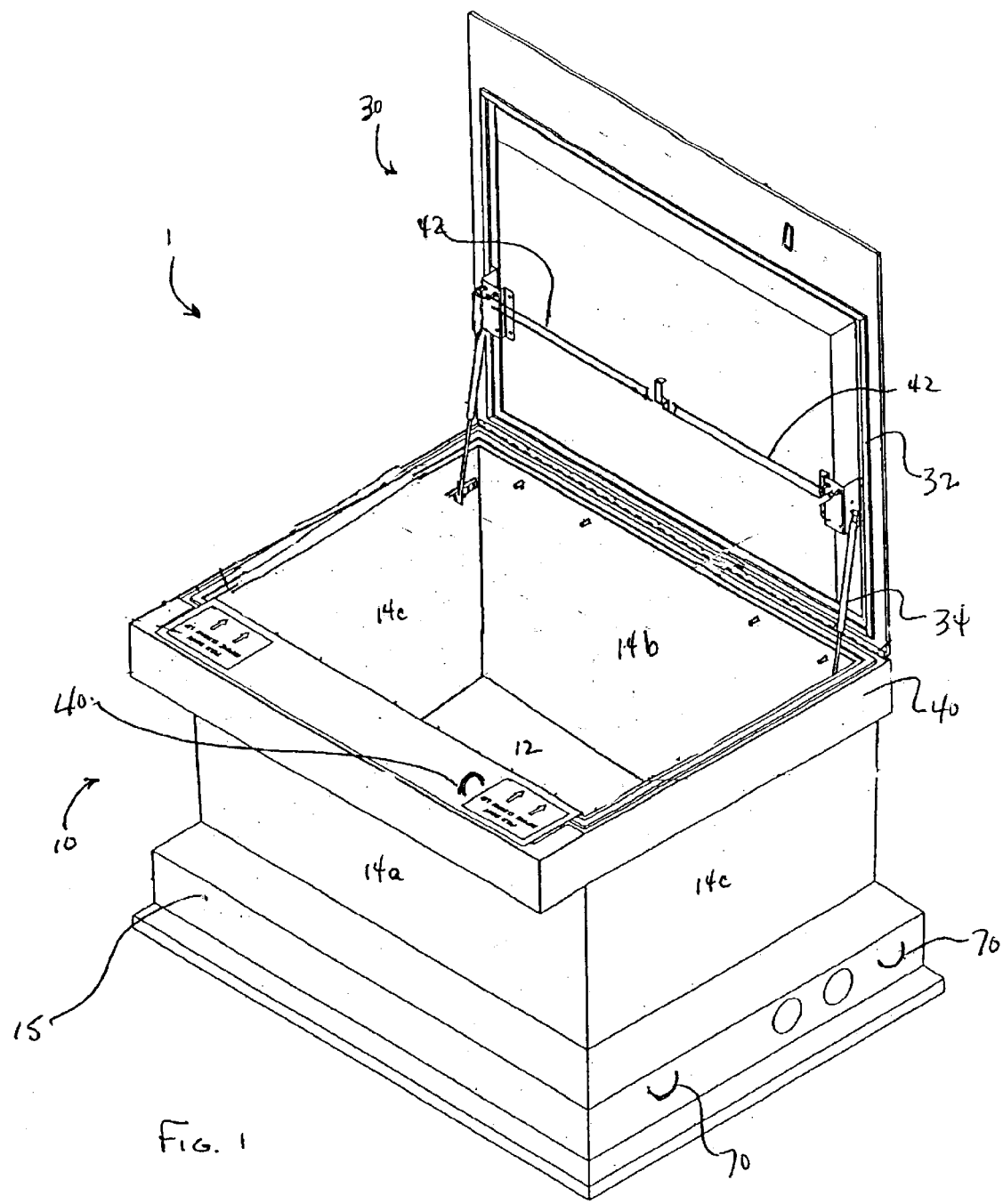
FIG. 1 is a front perspective view of the vault of the present invention with the lid open.
Figure 2:
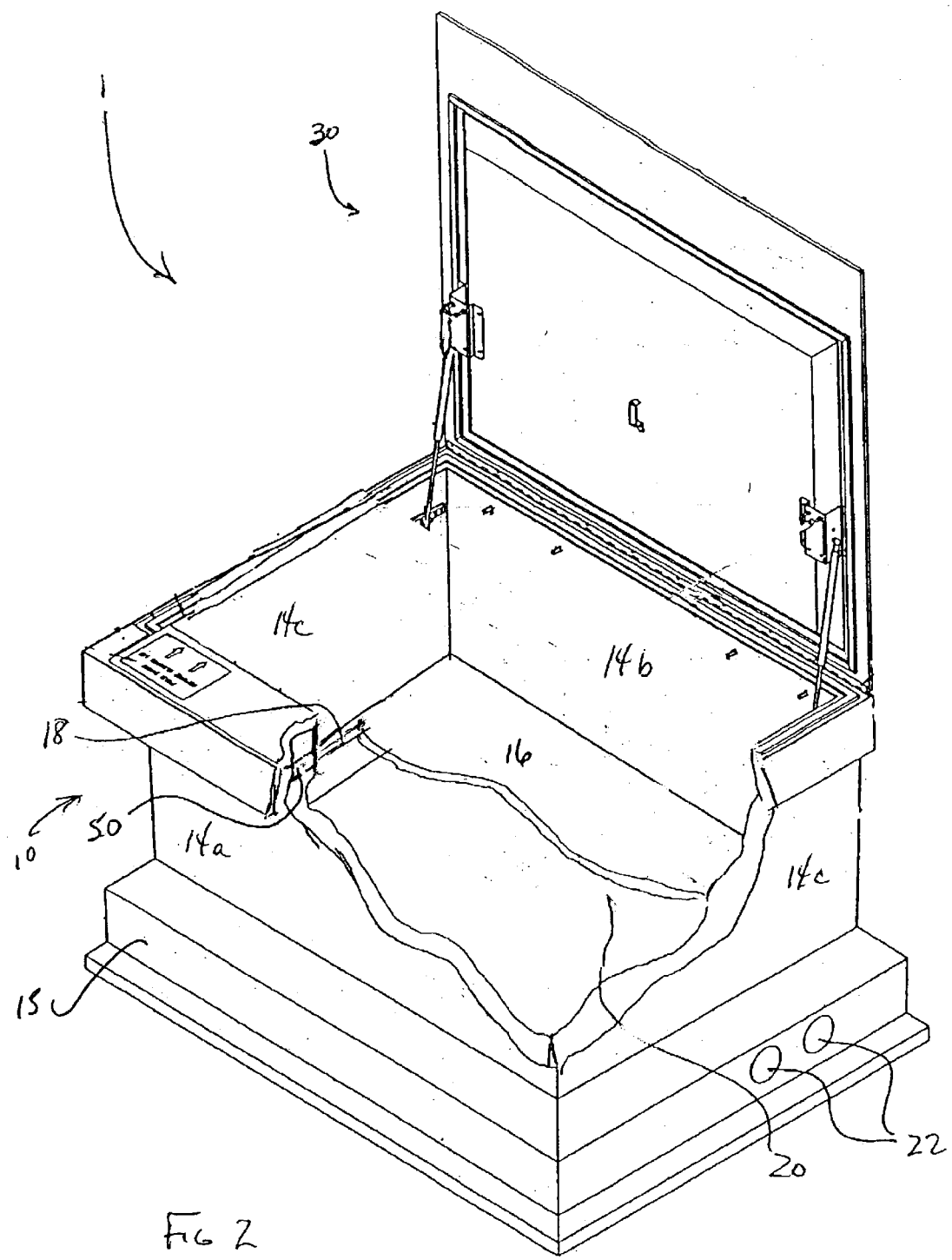
FIG. 2 is a partially cut away perspective view of the vault of the present invention showing the removable floor.
Figure 3:
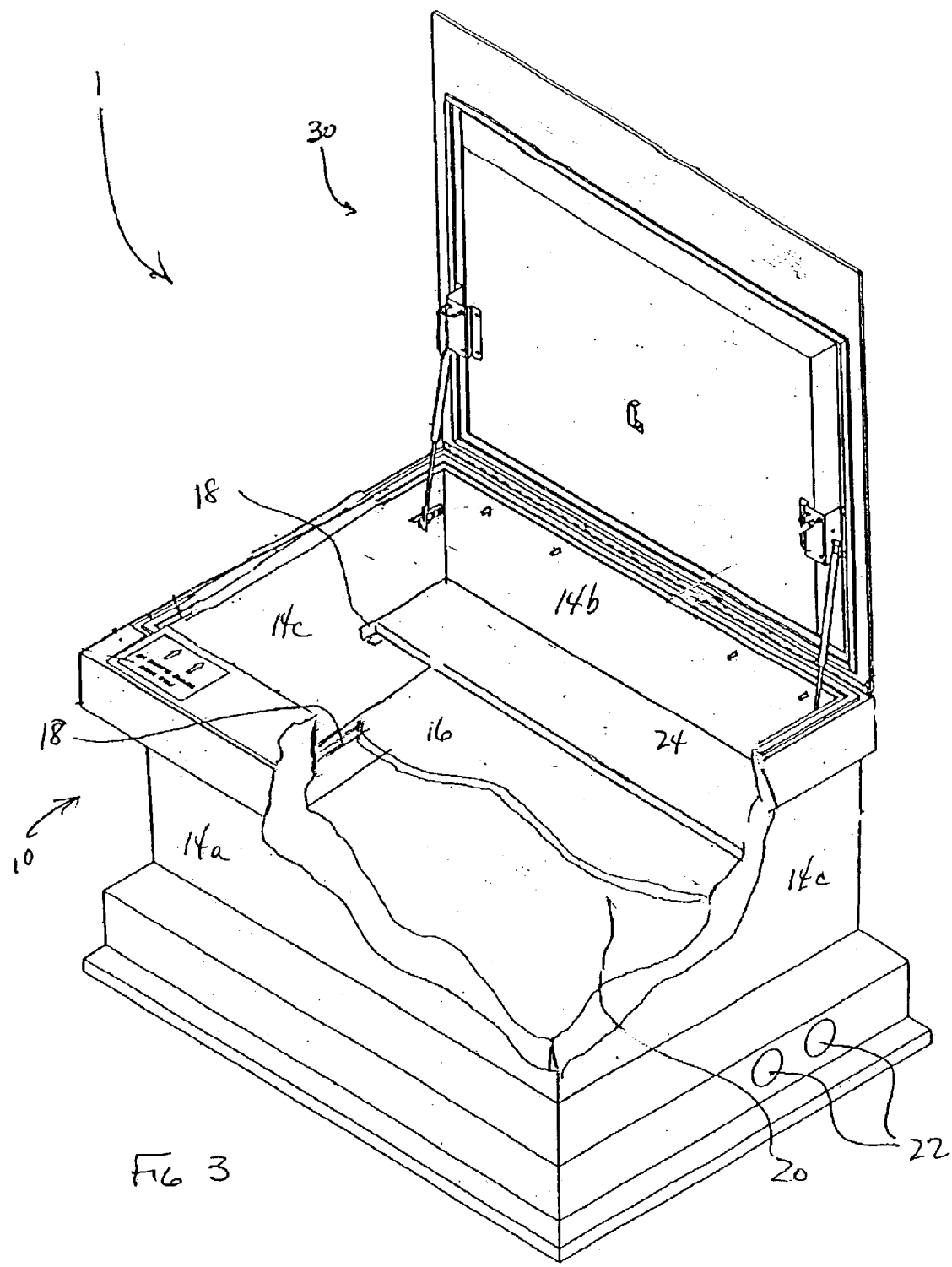
FIG. 3 is a partially cut away perspective view of the vault of the present invention showing the seat/step.
Figure 4:
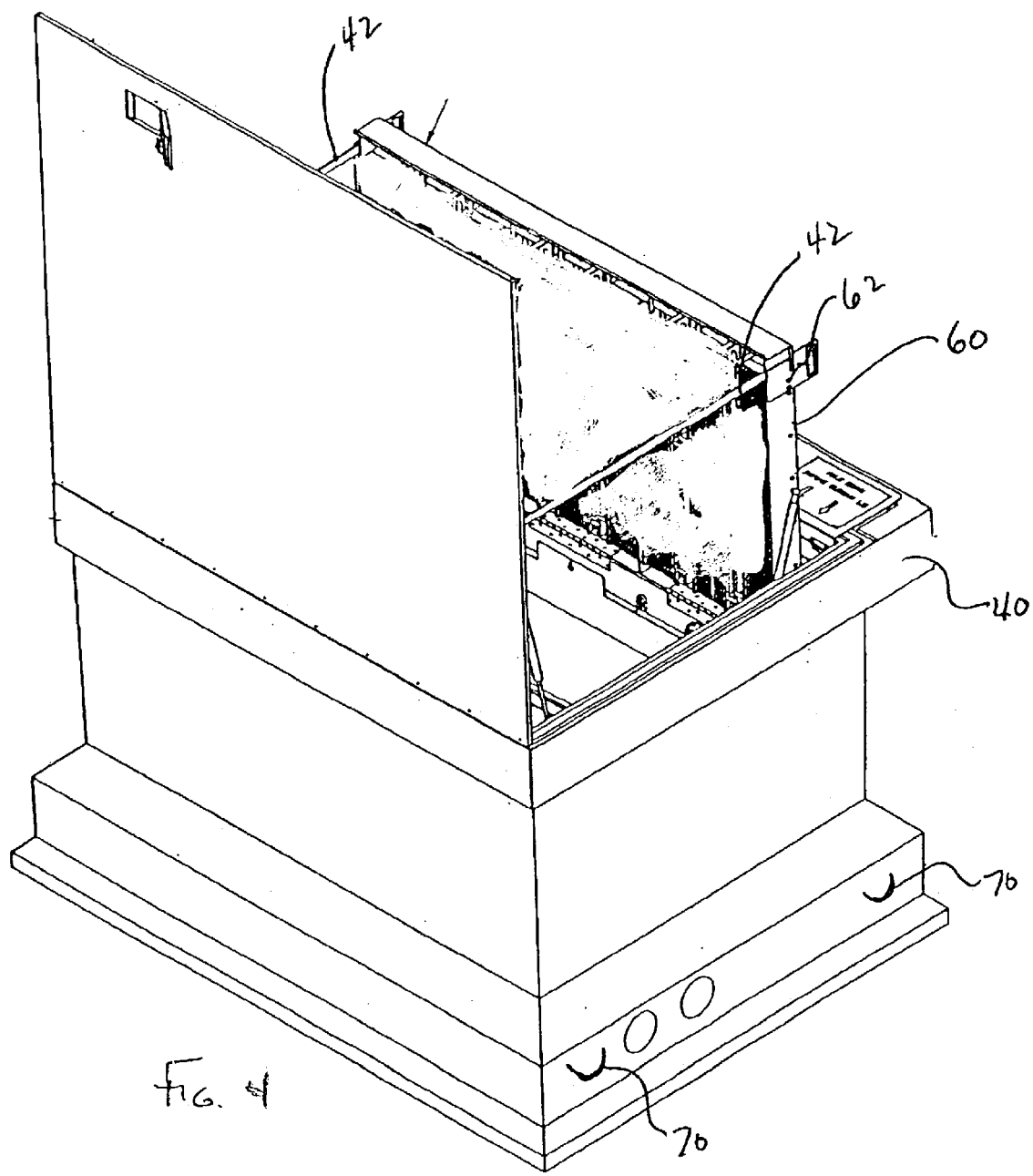
FIG. 4 is a rear perspective view of the open vault of the present invention showing the wiring frame in a raised position.

Referring first to FIGS. 1 thru 4, the below grade utilities vault 1 of the present invention, in its most simplistic elements, consists of a substantially rectilinear box 10 with a lid 30.

Box 10 has a bottom 12, a first wall 14a, a second, opposite wall 14b, and two end walls 14c, each wall 14 being substantially normal to each of the two adjacent walls 14 and to bottom 12. Box 10 is preferably formed of fiber reinforced concrete, thereby providing weight substantial enough to prevent box 10 from floating in the event of rising ground water. It would-be evident to one skilled in the art, however, that box 10 could be formed of a variety of other materials, such as, but not limited to, fiberglass, which are resistant to the effects of ground contact, such as oxidation or other forms of deterioration, providing the vault 1, in its entirety, is of sufficient weight to resist floating. A stepped flair 15 at the exterior base of each wall 14 provides additional resistance to vault 1 floating after gravel/soil is compacted thereabove.

Internal of box 10, at a distance above bottom 12, a removable floor 16 (FIG. 2) is suspended from walls 14 by brackets 18 attached to walls 14. Although a floor of multiple segments would be easier to manipulate, it would be evident to one skilled in the art that floor 16 could be of single or multiple unit construction or that floor 16 could be hingedly (not shown) attached to at least one wall 14 while suspended on brackets 18 on the remaining walls 14. Floor 16 could also be fully removable from the interior of box 1, suspended, solely, on brackets 18. A utilities stowage chamber 20 is formed in the space between bottom 12 and floor 16, with floor 16 providing protection to cables entering the vault into utilities chamber 20. Floor 16 also acts to keep dirt and debris from accumulating around the cable in utilities chamber 20. At least one utilities port 22 penetrates through at least one wall 14, proximate the bottom of wall 14, thereby allowing passage of utilities lines into utilities chamber 20 from the exterior of vault 1. Typically, at least two utilities ports are provided, allowing ingress and egress of utilities lines. A step/seat 24 extends along the interior length of one wall 14, providing a step for ingress into box 10, as well as a seat while performing work within box 10. Like floor 16, step/seat 24 is suspended on brackets 18 affixed to walls 14, or could be hingedly (not shown) attached to wall 14.

A lid 30 is hingedly attached to an upper edge of a wall 14 such that it completely covers box 10 when in the closed position, extending beyond the top of the opposite wall 14. A gasket 32 surrounds the perimetric edge of lid 30, such that a compressive seal is formed between lid 30 and the top of each of the walls 14. Gasket 32 is formed of a compressive material, such as, but not limited to, neoprene. The placement of gasket 32 into the lower surface of lid 30, as opposed to the upper surface of walls 14, provides an added protection of the gasket 32 from accumulations of dirt, grime and debris and from the wear and tear of rubbing by workers and/or equipment entering the vault 1. Pneumatic pistons 34 offset the weight of lid 30, thereby assisting in the opening and closing of lid 30 without undue effort. Lid 30 is typically hinged along the wall 14 adjacent step/seat 24.

A locking system cavity 36 (FIG. 5) is recessed into the upper surface of lid 30. Locking system cavity 36 has a lockable cover 38 and a hasp 40 adapted to receive a pad lock (not shown) within the cavity 36. This double locking system provides added security to vault 1 over that which would be afforded by a single lock. In a preferred embodiment, a perimetric frame 40 extends upwardly from the top of the walls 14, surrounding lid 30, thereby providing a defined perimeter of the top of vault 1 relative to surrounding surfaces.

A venting system 50 (FIG. 2) extends through the wall 14 of box 10 proximate the top of wall 14 opposite the hinge of lid 30. The extension of lid 30 beyond wall 14 provides protection of venting system 50 from the intake of water from above. A variety of venting systems are known in the art, including U.S. Pat. No. 6,016,828, issued to the present inventor on Jan. 25, 2000, which would be suitable for use in the present invention.

Connections for utilities like, but not limited to, electrical, CATV, and phone lines are facilitated by a wiring frame 60 (FIG. 4) which hingedly folds down into the confines of box 10 when in the closed position, and up into a substantially vertical position for use. Wiring frame 60 is mounted parallel to and proximate side 14 opposite the hinge of lid 30 such that when both lid 30 and wiring frame 60 are in the open position, they extend upwardly from each of two opposite sides 14. Once again, there are a variety of wiring frames known in the art, and, while the purpose of the present invention is to enclose the wiring frame, the frame itself is not deemed to be an integral part of the invention. Therefore, no further discussion of the specifics of the frame will be made.

In the interest of public safety, safety barriers are incorporated into the design of vault 1. A pair of safety barrier arms 42 (FIG. 4) are hingedly attached, one at each end, to lid 30 such that when lid 30 is in the open position and wiring frame 60 is in the open position, the safety barrier arms may be extended between lid 30 and wiring frame 60, thereby providing a barrier above each of the four sides 14. A safety barrier arm bracket 62 at each end of wiring frame 60 receives the free end of each safety barrier arm 42 when the safety barrier arms 42 are extended.

Lifting points 70 (FIGS. 1 & 4) are formed in the exterior surface of each of at least two of the four walls 14 to facilitate connection of a lifting device, such as a crane, for movement of vault 1 from place to place and for lowering vault 1 into its install position. Lifting points 70 would typically be a metal loop extending from the surface of wall 14, or other installation, many of which are known in the art.

It is to be understood that the present invention is not limited to the embodiments described above, but encompasses any and all embodiments within the scope of the following claims.

What is claimed is:

1. A below grade utilities vault comprising:
   a chamber, said chamber having:
      a bottom and
      four walls, said four walls being substantially normal to said bottom and to each other, and
      a lid, said lid hinged at a top edge of one of said walls and substantially parallel said bottom when in a closed position;
   lid lift assist means for assisting a user in lifting said lid to an open position;
   locking means for securing said lid in a closed position;
   sealing means for sealing said lid against said four walls to prevent ingress of water into the interior of said vault;
   venting means for venting gasses from said chamber when said lid is in a closed position and equalizing air pressure between the interior and exterior of said vault;
   utilities access means for allowing passage of utilities lines into and out from the interior of said vault;
   step means for aiding in descent into and ascent from the interior of said vault;
   barrier means for providing a safety barrier around the perimeter of said vault when said lid is in an open position;
   flooring means for providing a standing surface, said standing surface being above said bottom and said utilities access means; and
   mounting means for mounting utilities connections at a level above said flooring means.

2. A below grade utilities vault, as defined in claim 1, wherein said bottom and said four walls comprise fiber reinforced concrete.

3. A below grade utilities vault, as defined in claim 2, wherein said lid is formed of reinforced fiberglass.

4. A below grade utilities vault, as defined in claim 3, wherein said lid lifting assist means comprises at least one pneumatic piston attached at a first end to at least one of said walls and at a second end to said lid.

5. A below grade utilities vault, as defined in claim 4, wherein said locking means comprises:
   a cavity recessed within an outer surface of said lid,
   a lockable cover hingedly attached at a side of said cavity,
   a locking mechanism mounted within said lockable cover such that said lockable cover may be secured in a closed position lockably sealing said cavity, and
   a hasp extending upwardly from of one of said walls through a bottom surface of said cavity, said hasp adapted to receive a pad lock.

6. A below grade utilities vault, as defined in claim 5, wherein said venting means comprises a passage through at least one of said walls of said box.

7. A below grade utilities vault, as defined in claim 6, wherein said utilities access means comprises at least one aperture through at least one of said walls of said box proximate said bottom of said box.

8. A below grade utilities vault, as defined in claim 7, wherein said step means comprises a substantially horizontal step platform suspended from at least one of said walls extending for a determined distance from said wall at a determined distance below a top edge of said walls.

9. A below grade utilities vault, as defined in claim 8, wherein said flooring means comprises at least one substantially horizontal floor platform suspended from at least one of said walls at a determined distance above said bottom of said box, said at least one floor platform fully occupying the area between said walls, said at least one floor platform between said bottom of said box and said step platform.

10. A below grade utilities vault, as defined in claim 9, wherein said mounting means comprises a wiring frame hingedly attached proximate an upper edge of said one of said walls opposite said hinge of said lid, such that said wiring frame can be hinged down into said box when not in use and hinged to a substantially vertical position for working access.

11. A below grade utilities vault, as defined in claim 10, wherein said barrier means comprises said lid when in an open position, said wiring frame when in an open position, and a barrier arm hingedly attached at each of the two ends of said lid such that each of said barrier arms may be hinged against an interior surface of said lid when not in use and hinged to extend to an end of said wiring frame, thereby forming a barrier between said lid and said wiring frame.

* * * * *